United States Patent
Crossley

(10) Patent No.: US 9,892,759 B2
(45) Date of Patent: Feb. 13, 2018

(54) SYNCHRONIZED PRESENTATION OF FACETS OF A GAME EVENT

(71) Applicant: CBS INTERACTIVE INC., San Francisco, CA (US)

(72) Inventor: Brett Marcus Crossley, Salisbury, NC (US)

(73) Assignee: CBS Interactive Inc., New York, NY (US)

( * ) Notice: Subject to any disclaimer, the term of this patent is extended or adjusted under 35 U.S.C. 154(b) by 933 days.

(21) Appl. No.: 13/729,784

(22) Filed: Dec. 28, 2012

(65) Prior Publication Data

US 2014/0187334 A1   Jul. 3, 2014

(51) Int. Cl.
*A63F 13/44* (2014.01)
*G11B 27/10* (2006.01)
*G11B 27/034* (2006.01)

(52) U.S. Cl.
CPC ............ *G11B 27/105* (2013.01); *A63F 13/44* (2014.09); *G11B 27/034* (2013.01)

(58) Field of Classification Search
CPC .......... H04N 21/4307; G06F 17/30041; H04H 20/18; H04H 60/06; H04L 9/3297
USPC ......................................................... 463/43
See application file for complete search history.

(56) References Cited

U.S. PATENT DOCUMENTS

| 6,630,963 | B1* | 10/2003 | Billmaier | H04H 20/18 348/485 |
| 8,400,436 | B1* | 3/2013 | Kuck | H04H 60/06 345/204 |
| 9,032,296 | B1* | 5/2015 | Jeffs | G06F 3/0482 715/719 |
| 2009/0082110 | A1* | 3/2009 | Relyea | G07F 17/32 463/42 |
| 2009/0132610 | A1* | 5/2009 | Bedingfield, Sr. | G06F 17/30041 |
| 2012/0184363 | A1* | 7/2012 | Barclay et al. | 463/25 |
| 2012/0295240 | A1* | 11/2012 | Walker et al. | 434/262 |
| 2013/0116032 | A1* | 5/2013 | Lutnick | 463/17 |

* cited by examiner

*Primary Examiner* — Dmitry Suhol
*Assistant Examiner* — Ankit Doshi

(57) ABSTRACT

Various embodiments are generally directed to use of ancillary information related to play of a game event in which actions in the game are timestamped to enable synchronized presentation alongside an audio/visual program of the game event. An apparatus includes logic to receive a program data comprising a video recording of a game event, receive ancillary data including an indication of an action related to play of the game event, a first timestamp indicating a first time for start of the video recording, and a second timestamp indicating a second time for the action; visually present the video recording in a first portion of the display; and use the first and second timestamps to synchronize a visual presentation of the action in a second portion of the display with a depiction of the action in the visual presentation of the video recording. Other embodiments are described and claimed herein.

24 Claims, 10 Drawing Sheets

SYNCHRONIZED PRESENTATION OF FACETS OF A GAME EVENT

BACKGROUND

Especially since the introduction of VCRs (video cassette recorders), so-called "time-shifting" of audio/visual programs by recording them from radio frequency (RF) transmissions over the air, from a satellite or from a RF cable network for later playback has become commonplace. This also includes game events in which the sights and sounds of game play are transmitted as the video and audio portions of an audio/visual program. Further, a commonplace practice to conveying scores, official timekeeping and statistics related to the play of a game event has been to devote subparts of the visual portion of the audio/visual program to displaying such information (e.g., overlays and/or cutaways), and/or to dub voice commentary about such information into the audio portion of the audio/visual program.

As a result of this audio and/or visual embedding of scores, official timekeeping and statistics in one or both of the audio and visual portions of an audio/visual program of a game event, synchronization of the presentation of such information alongside the presentation of the sights and sounds of game play is easily maintained. Specifically, the presentation of the scores resulting from every play that occurs (e.g., goals, hits, balls, runs, outs, etc.) remains properly synchronized with the presentation of the sights and sounds of those actions of the game play, itself. This has also enabled such synchronization to be maintained, even where presentation of an audio/visual program of a game is time-shifted such that it occurs days or weeks after having been recorded from an RF transmission.

With the advent of streaming of audio/visual programs via the Internet to computer systems and/or so-called "smart televisions" has become commonplace, there is a desire to take advantage of various abilities of some of these computing devices to visually split apart the presentation of scores, official timekeeping and statistics of a game event from the visual presentation of the sights of game play. Specifically, there is a desire to present the sights of game play with fewer overlays and/or cutaways showing such other information so as to "unclutter" the presentation of the sights of the game play by visually presenting scores, official timekeeping and statistics in areas of a display of such computing devices that are separate from an area of the display on which the visual portion of the audio/visual program is presented.

However, typical practice in the streaming of audio/visual programs via a network, including the Internet, entails use of data formats for the audio and/or visual portions that do not make allowance for inclusion of or synchronization with other types of data, unless that data is embedded in the audio or visual portions in the same manner as in the aforementioned RF transmissions. As a result, such other data as the scores, official timekeeping and statistics related to play of a game event must be separately transmitted, which invites the possibility that their presentation may not be synchronized with the presentation of the audio/visual program. Thus, for example, the presentation of a change in score as a result of a play in the game event may occur before presentation of the play that lead to that change in score in the audio/visual program.

The separate transmission of scores and statistics also renders time-shifted presentations of a game event difficult. A smart television or other computing device, upon contacting a server storing scores and statistics of a game event to obtain such information for presentation, will be provided with the final score and finalized statistics. Thus, while the audio/visual program conveying the sights and sounds of game play is presented hours, days or weeks after the game event has occurred, the desire of a person seeking to experience the play of that game event as it occurred will be ruined by the presentation of scores and statistics informing them of the final outcome. It is with respect to these and other considerations that the techniques described herein are needed.

DETAILED DESCRIPTION

Figure 1A:
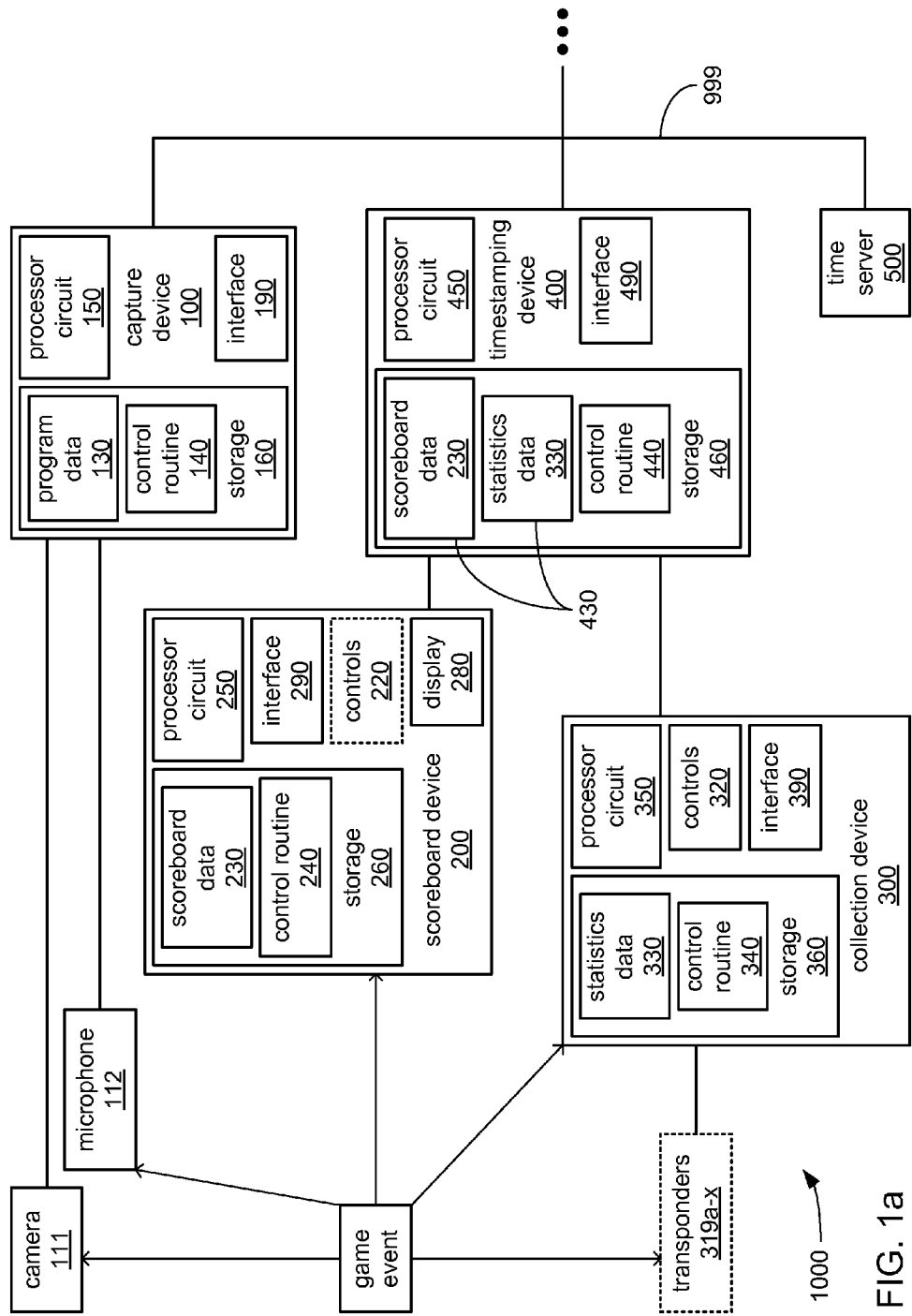
FIGS. 1*a* and 1*b*, together, illustrate a first embodiment of interaction among computing devices.

Various embodiments are generally directed to storage, transmission and/or presentation of ancillary information related to play of a game event in which indications of actions therein and of milestones in recordation of audio and video of an audio/visual program of the game event are timestamped with timing information that enables synchronized presentation of the ancillary data alongside a presentation of the audio/visual program. More specifically, ancillary information such as indications of actions in scoring, official timekeeping, and/or statistics of play are stored in an ancillary data and timestamped in that ancillary data as the game event occurs. This timestamping also incorporates references to milestones in the recording of the sights and sounds of game play to aid in synchronizing subsequent presentation of the ancillary information with presentation of the audio/visual program of the sights and sounds of play of the game event.

The audio/visual program conveying sights and sounds of game play may be transmitted to presentation devices as game play occurs alongside separate transmissions of the ancillary information. At each of those presentation devices, the presentation of the ancillary information is synchronized to the presentation of the audio/visual program, making use of the previously noted milestones.

Alternatively or additionally, the audio/visual program may be stored as part of a program database made up of multiple audio/visual programs of game events, and the ancillary information may be stored as part of one or more databases of ancillary information of game events. At a later time, a presentation device may request to receive transmissions of the audio/visual program and ancillary information of that game event. In response to the request, the audio/visual program and ancillary information are transmitted to that presentation device in separate transmissions. Again, at that presentation device, the presentation of the ancillary information is synchronized to the presentation of the audio/visual program, making use of the previously noted milestones.

By way of example, an apparatus includes a display, a processor circuit, and logic to receive a program data comprising a video recording of a game event; receive an ancillary data comprising an indication of an action related to play of the game event, a first timestamp indicating a first time associated with a start of the video recording, and a second timestamp indicating a second time associated with the action; visually present the video recording in a first portion of a display area of the display; and use the first and second timestamps to synchronize a visual presentation of the action in a second portion of the display area of the display with a depiction of the action in the visual presentation of the video recording. Other embodiments are described and claimed herein.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may comprise a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of a synchronized presentation system 1000 comprising one or more of a capture device 100; a scoreboard device 200; a collection device 300; a timestamping device 400; a time server 500; a program server 600; an information server 700; and presentation devices 800a, 800b and 800c. Each of the computing devices 100, 200, 300, 400, 500, 600, 700 and 800a-c may be any of a variety of types of computing device, including without limitation, a desktop computer system, a data entry terminal, a laptop computer, a netbook computer, an ultrabook computer, a tablet computer, a handheld personal data assistant, a smartphone, a body-worn computing device incorporated into clothing, a computing device integrated into a vehicle (e.g., a car, a bicycle, a wheelchair, etc.), a server, a cluster of servers, a server farm, etc.

As depicted, at least some of the computing devices 100, 200, 300, 400, 500, 600, 700 and 800a-c exchange signals concerning audio/visual programs and ancillary data (e.g., scoring, statistics, official time keeping, etc.) related to one or more game events of one or more games through portions of at least one network 999. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission. However, as depicted, one or more of the computing devices 100, 200, 300 and 400 may be coupled via other forms of link by which signals are not routed through a portion of the network 999. This may be deemed desirable where two or more of these computing devices 100, 200, 300 and 400 are in close physical proximity to each other.

The capture device 100 receives audio of sounds and video of sights of play of a game event, and stores them as a program data 130 at least as game play occurs. Also as game play occurs, the capture device 100 transmits the program data 130 to the program server 600, which stores the program data 130 as part of a program database 630 made up of multiple ones of program data, each of a different game event. Either while play of the game event continues, or at a later time after the game event has concluded, the program server 600 transmits the program data 130 to one or more of the presentation devices 800a-c for visual presentation.

At least while the capture device 100 stores and transmits the program data 130 as just described, the scoreboard device 200 maintains the current score and/or the official game time of the game event. It is envisioned that the scoreboard device 200 may be the scoreboard display device of the venue at which the game event occurs, visually presenting the scores and/or official game time of the game event on a display 280 for an audience attending the game event to view. The scoreboard device 200 maintains the current scores and official time as a scoreboard data 230, and at least as the game play occurs, the scoreboard device 200 transmits the scoreboard data 230 to the timestamping device 400. Also at least while the capture device 100 stores and transmits the program data 130, the collection device 300 receives additional statistics about play of the game event. The collection device 300 maintains those statistics as a statistics data 330, and at least as game play of the game event occurs, the collection device 300 transmits the statistics data 330 to the timestamping device 400.

The timestamping device 400 stores the scoreboard data 230 and the statistics data 330, and together, the scoreboard data 230 and the statistics data 330 form at least part of the ancillary data 430 of the game event. The timestamping device 400 timestamps each indication of an action related to play of the game event, including and not limited to, a change in score and/or of a change in official timekeeping (e.g., each instance of a starting or stopping of an official game clock) in the scoreboard data 230 received from the scoreboard device 200, and each indication of a new statistic arising from game play (e.g., a player running a specific number of yards, a specific number of strokes to sink a putt, etc.) in the statistics data 330 received from the collection device 300. In so doing, the timestamping device 400 augments those indications of a play related action in each of the scoreboard data 230 and the statistics data 330. The timestamps with which each of the scoreboard data 230 and the statistics data 330 are augmented further include timestamps marking milestones in the recording of sights and sounds of the play of the game event as stored in the program data 130 (e.g., when recording of sights and sounds began, ended, resumed, etc.), as indicated to the timestamping device 400 by the capture device 100. These timestamps may provide indications of time that are referenced to the time of a specific time zone, to Greenwich meridian time (GMT), to coordinated universal time (UTC), or to some other widely used time reference provided by the time server 500 via the network 999. Alternatively or additionally, these timestamps may provide indications of time that are referenced to one or more milestones of the recording of the sights and sounds of the play of the game event of which the program data 130 is composed, such as when recording of sights and sounds commenced.

As game play occurs, the timestamping device 400 retransmits the now augmented variants of the scoreboard data 230 and the statistics data 330 (in other words, retransmits the ancillary data 430, now augmented with timestamps for play-related actions) to the information server 700. The information server 700 stores the scoreboard data 230 as part of a scoreboard database 732 made up of multiple ones of scoreboard data, each of a different game event. Similarly, the information server 700 stores the statistics data 330 as part of a statistics database 733 made up of multiple ones of statistics data, each of a different game event. Either while play of the game event continues, or at a later time after the game event has concluded, the information server 700 transmits the scoreboard data 230 and the statistics data 330 to one or more of the presentation devices 800*a-c* for visual presentation, as the program server 600 also transmits the program data 130 to the same one or more of the presentation devices 800*a-c*.

In various embodiments, the capture device 100 comprises a storage 160 storing a control routine 140 and the program data 130, a processor circuit 150, and an interface 190 coupling the capture device 100 to the network 999. In executing a sequence of instructions of at least the control routine 140, the processor circuit 150 is caused to receive signals from one or more of a camera 111 conveying video of captured of sights of the play of the game event, and signals from one or more of a microphone 112 conveying audio of captured sounds of the play of the game event. The processor circuit 150 stores the captured audio and video as the program data 130. In some embodiments, the capture device 100 may be operated to edit the program data 130, at least to the extent of selecting different camera views and/or different mixes of detected sounds (e.g., including audio dubbing of voice sounds from a commentator who may be present at the game event). The processor circuit 150 is also caused to transmit signals indicating the occurrence of one or more milestones in the recording of audio and/or video of game play (e.g., starting of recording, stopping of recording, etc.) to the timestamping device 400. It is envisioned that the program data 130 is stored in any of a variety of commonly used and widely accepted data formats, many of which do support the inclusion of timestamping information to mark occurrences of game-related actions along with the audio and video data therein. Thus, indications of milestones such as the starting or stopping of recording of audio and/or video are transmitted to the timestamping device 400 to enable the scoreboard data 230 and/or the statistics data 330 to be augmented by the timestamping device 400 with timestamps indicating such milestones to enable later synchronization in presenting the programs data 130 alongside one or both of the scoreboard data 230 and the statistics data 330. Further, the processor circuit 150 is caused to transmit the program data 130 to the program server 600, at least as game play occurs.

In various embodiments, the scoreboard device 200 comprises a storage 260 storing a control routine 240 and the scoreboard data 230, a processor circuit 250, controls 220, the display 280, and an interface 290. As previously discussed, the interface 290 may couple the scoreboard device 200 to the timestamping device 400 via the network 999, or more directly. In executing a sequence of instructions of at least the control routine 240, the processor circuit 250 is caused to maintain the scoreboard data 230 indicating current score and official game time. As it is envisioned that the scoreboard device 200 serves to visually present such information to audience members who are personally in attendance at the venue at which the game event occurs, the processor circuit 250 operates the display 280 to so visually present such information to such an audience. Depending on the nature of the game event (e.g., whether it is a sporting event, a chess match, a game show, etc.), it is envisioned as likely that the scoreboard device 200 will receive updates to the score and/or indications to change an official timekeeping of the game event (e.g., indications to start or stop an official game clock) via signals from controls (not shown) employed in manual entry of such information, possibly via the controls 220 (if present). However, other embodiments are possible in which the scoreboard device 200 may be coupled to one or more sensors and/or other automated input devices that provide the scoreboard device 200 with indications of scoring and/or instances of needed changes in official timekeeping. Further, the processor circuit 250 is caused to transmit the scoreboard data 230 to the timestamping device 400, at least as game play occurs.

In various embodiments, the collection device 300 comprises a storage 360 storing a control routine 340 and the statistics data 330, a processor circuit 350, controls 320 and an interface 390. As previously discussed, the interface 390 may couple the collection device 300 to the timestamping device 400 via the network 999, or more directly. In executing a sequence of instructions of at least the control routine 340, the processor circuit 350 is receive signals indicative of statistical information associated with the play of the game event. The signals awaited may be signals indicative of operation of the controls 320 (e.g., keys of a keyboard or keypad, a mouse, a touchpad, a touchscreen, etc.) by a person monitoring the game event and thereby entering statistical information. In other words, the signals awaited may be indicative of manual entry of statistical information arising from each play of the game event as it progresses. Alternatively or additionally, those signals may be received by a component of the interface 390 from one or more of transponders 319*a-x* disposed about various locations related to the game event. More specifically, in some games events, transponders are carried by players, racing vehicles, locations of goals, etc. to enable automated tracking of movement and/or to detect successful scoring. Further, the processor circuit 350 is caused to transmit the statistics data 330 to the timestamping device 400, at least as game play occurs.

The exact nature of the statistics information making up the statistics data 330 depends on the type of game played. Thus, the statistics data 330 could include indications of one or more of distances run, bicycled, driven, jumped, thrown, etc. by particular players; distances by which a ball, puck, token, etc., is moved in a given direction across a field or about a game board; goals scored; fastest times; number of laps and/or pit stops; number of timeouts and/or penalty points; number of holes-in-one and/or under par; number of swings, misses, balls, strikes, spares, fouls, home runs and/or outs; fastest pitch and/or longest kick; number of enemy soldiers caught or killed; number of times being killed or number of lives left; number of planes shot down or times acquiring "flying ace" status; number of instances of checking a king, checkmate, or crowning a king; number of properties acquired on "Park Avenue" or their value; etc.

In various embodiments, the timestamping device 400 comprises a storage 460 storing a control routine 440, the scoreboard data 230 and the statistics data 330; a processor circuit 450, and an interface 490 coupling the timestamping device 400 to the network 999. In executing a sequence of instructions of at least the control routine 440, the processor circuit 450 is caused to receive the scoreboard data 230, the statistics data 330, indications of milestones in the recording of audio and/or video of the game event from the capture device 100, and possibly also an indication of the current time from the time server 500. As previously discussed, the timestamping of indications of various actions in each of the scoreboard data 230 and the statistics data 330 may be referenced to a time zone or other widely accepted standard time reference (possibly based on indications of a current time received from the time server 500), or may be referenced relative to a milestone in the recording of audio and/or video as received in an indication from the capture device 100 (e.g., referenced to the moment at which recording of audio and/or video began). Regardless of the exact nature of how time is indicated in each of the timestamps, the processor circuit 450 is caused to maintain a clock that is either synchronized to a current time provided by a time server to provide current time throughout play of the game event or synchronized to an indication of a milestone for start of recordation of audio and/or video to provide an indication of the passage of time since that milestone. After augmenting each of the scoreboard data 230 and the statistics data 330 with timestamps for the various actions indicated therein related to play of the game event, the processor circuit 450 is caused to operate the interface 490 to retransmit each to the information server 700.

It should be noted that it is envisioned that most if not all of the computing devices 100, 200, 300 and 400 are likely to be co-located at the venue at which the game event occurs. As a result, and in various possible embodiments, one or more of these computing devices may be combined into a single computing device such that the aforedescribed functions of more than one of the computing devices may be performed by a single computing device.

In various embodiments, the program server 600 comprises a storage 660 storing a control routine 640 and the program database 630 (including the program data 130), a processor circuit 650, and an interface 690 coupling the program server 600 to the network 999. In executing a sequence of instructions of at least the control routine 640, the processor circuit 650 is caused to operate the interface 690 to receive signals conveying the program data 130 from the capture device 100 via the network 999, and is caused to store the program data 130 as part of the program database 630. As previously discussed, the program database 630 is made up of multiple ones of such data as the program data 130, each one of such data including an audio/visual program of a game event. Either as the game event occurs or in response to a request received from one of the presentation devices 800a-c at a later time, the processor circuit 650 is caused to transmit the program data 130 to one or more of the presentation devices 800a-c for presentation. The processor circuit 650 is also caused to operate the interface 690 to exchange signals with the information server 700 to ensure that the scoreboard data 230 and the statistics data 330 are also transmitted to the same one or more of the presentation devices 800a-c for presentation alongside the program data 130 in a synchronized manner.

The program server 600 may also store an advertisement database 639 within the storage 660 made up of various audio/visual presentations of advertisements. As will be explained in greater detail, one or more advertisements of the advertisement database 639 may be transmitted by the program server 600 to the one or more of the presentation devices 880a-c, along with the program data 130, to be automatically presented during periods of time in which game play has been paused (e.g., during a timeout).

In various embodiments, the information server 700 comprises a storage 760 storing a control routine 740, the scoreboard database 732 (including the scoreboard data 230) and the statistics database 733 (including the statistics data 330); a processor circuit 750, and an interface 790 coupling the information server 700 to the network 999. In executing a sequence of instructions of at least the control routine 740, the processor circuit 750 is caused to operate the interface 790 to receive signals conveying the scoreboard data 230 and the statistics data 330 (as augmented with timestamps by the timestamping device 400) from the timestamping device 400 via the network 999, and is caused to store the scoreboard data 230 and the statistics data 330. As previously discussed, the scoreboard database 732 is made up of multiple ones of such data as the scoreboard data 230, each one of such data including an audio/visual program of a game event. As also previously discussed, the statistics database 733 is made up of multiple ones of such data as the statistics data 330, each one of such data including an audio/visual program of a game event. Either as the game event occurs or in response to a request received from one of the presentation devices 800a-c at a later time, the processor circuit 750 is caused to transmit the scoreboard data 230 and the statistics data 330 to one or more of the presentation devices 800a-c for presentation. The processor circuit 750 is also caused to exchange signals with the program server 600 to ensure that the program data 130 is transmitted to the same one or more of the presentation devices 800a-c for synchronized presentation.

The statistics data making up the statistics database 733 may be organized to enable correlation of game events to individual players and/or teams; locations and/or dates played; types of plays (e.g., runs, passes, punts, kicks, dunks, captures, kills, surrenders, checking of kings, etc.); official calls made (e.g., fouls, time-outs, penalties, etc.); etc. Depending on the type of game and/or the statistics received (such as the statistics indicated in the statistics data 330), the processor circuit 750 is caused to perform various mathematical and/or other operations based on scoring rules, etc. to augment the statistics database 733 to reflect the incoming statistics of at least the statistics data 330 (e.g., adding distances, discounting previously earned points due to penalties, etc), and possibly also the scoreboard data 230. The processor circuit 750 may additionally augment the statistics data 330 with historical statistics information beyond the statistics of just the one game event from which the statistics data 330 is created.

In various embodiments, each of the presentation devices 800a-c comprises a storage 860 storing a control routine 740, the program data 130, the scoreboard data 230 and the statistics data 330; a processor circuit 850, controls 820, a display 880, and an interface 890 coupling each of the collection devices 800a-c to the network 999. In executing a sequence of instructions of at least the control routine 840, the processor circuit 850 of each of the presentation devices 800a-c is caused to receive the program data 130, the scoreboard data 230 and the statistics data 330 via the network 999. The processor circuit 850 is then caused to employ the timestamping incorporated into each of the scoreboard data 230 and statistics data 330 to synchronize their visual presentation with the visual presentation of the video portion conveying the sights of the game event of the program data 130 on the display 880. The processor circuit 850 is also caused to receive signals indicative of operation of the controls 820, possibly conveying commands from a viewer of the display 880 to select the game event for presentation on the display 880 and/or to control aspects of the presentation (e.g., brightness/contrast adjustments of the display 880).

In various embodiments, each of the processor circuits 150, 250, 350, 450, 650, 750 and 850 may comprise any of a wide variety of commercially available processors, including without limitation, an AMD® Athlon®, Duron® or Opteron® processor; an ARM® application, embedded or secure processor; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon® or XScale® processor. Further, one or more of these processor circuits may comprise a multi-core processor (whether the multiple cores coexist on the same or separate dies), and/or a multi-processor architecture of some other variety by which multiple physically separate processors are in some way linked.

In various embodiments, each of the storages 160, 260, 360, 460, 660, 760 and 860 may be based on any of a wide variety of information storage technologies, possibly including volatile technologies requiring the uninterrupted provision of electric power, and possibly including technologies entailing the use of machine-readable storage media that may or may not be removable. Thus, each of these storages may comprise any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may comprise multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, each of the interfaces 190, 290, 390, 490, 690, 790 and 890 employ any of a wide variety of signaling technologies enabling each of computing devices 100, 200, 300, 400, 600, 700 and 800, respectively, to be coupled through the network 999 as has been described. Each of these interfaces comprises circuitry providing at least some of the requisite functionality to enable such coupling. However, each of these interfaces may also be at least partially implemented with sequences of instructions executed by corresponding ones of the processor circuits 150, 250, 350, 450, 650, 750 and 850 (e.g., to implement a protocol stack or other features). Where one or more portions of the network 999 employs electrically and/or optically conductive cabling, one or more of these interfaces may employ signaling and/or protocols conforming to any of a variety of industry standards, including without limitation, RS-232C, RS-422, USB, Ethernet (IEEE-802.3) or IEEE-1394. Alternatively or additionally, where one or more portions of the network 999 entails the use of wireless signal transmission, one or more of these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc. It should be noted that although each of the interfaces 190, 290, 390, 490, 690, 790 and 890 are depicted as a single block, one or more of these may comprise multiple interfaces that may be based on differing signaling technologies. This may be the case especially where one or more of these interfaces couples corresponding ones of the computing devices 100, 200, 300, 400, 600, 700 and 800 to more than one network, each employing differing communications technologies.

In various embodiments, each of the controls 120 and 820 may comprise any of a variety of types of manually-operable controls, including without limitation, lever, rocker, push-button or other types of switches; rotary, sliding or other types of variable controls; touch sensors, proximity sensors, heat sensors or bioelectric sensors, etc. Each of these controls may comprise manually-operable controls disposed upon a casing of corresponding ones of the computing devices 100 and 800, and/or may comprise manually-operable controls disposed on a separate casing of a physically separate component of corresponding ones of these computing devices (e.g., a remote control coupled to other components via infrared signaling). Alternatively or additionally, each of these controls may comprise any of a variety of non-tactile user input components, including without limitation, a microphone by which sounds may be detected to enable recognition of a verbal command; a camera through which a face or facial expression may be recognized; an accelerometer by which direction, speed, force, acceleration and/or other characteristics of movement may be detected to enable recognition of a gesture; etc.

In various embodiments, each of the displays 280 and 880 may be based on any of a variety of display technologies, including without limitation, a liquid crystal display (LCD), including touch-sensitive, color, and thin-film transistor (TFT) LCD; a plasma display; a light emitting diode (LED) display; an organic light emitting diode (OLED) display; a cathode ray tube (CRT) display, etc. Each of these displays may be disposed on a casing of corresponding ones of the computing devices 200 and 800, or may be disposed on a separate casing of a physically separate component of corresponding ones of these computing devices (e.g., a flat panel monitor coupled to other components via cabling).

Figure 1B:
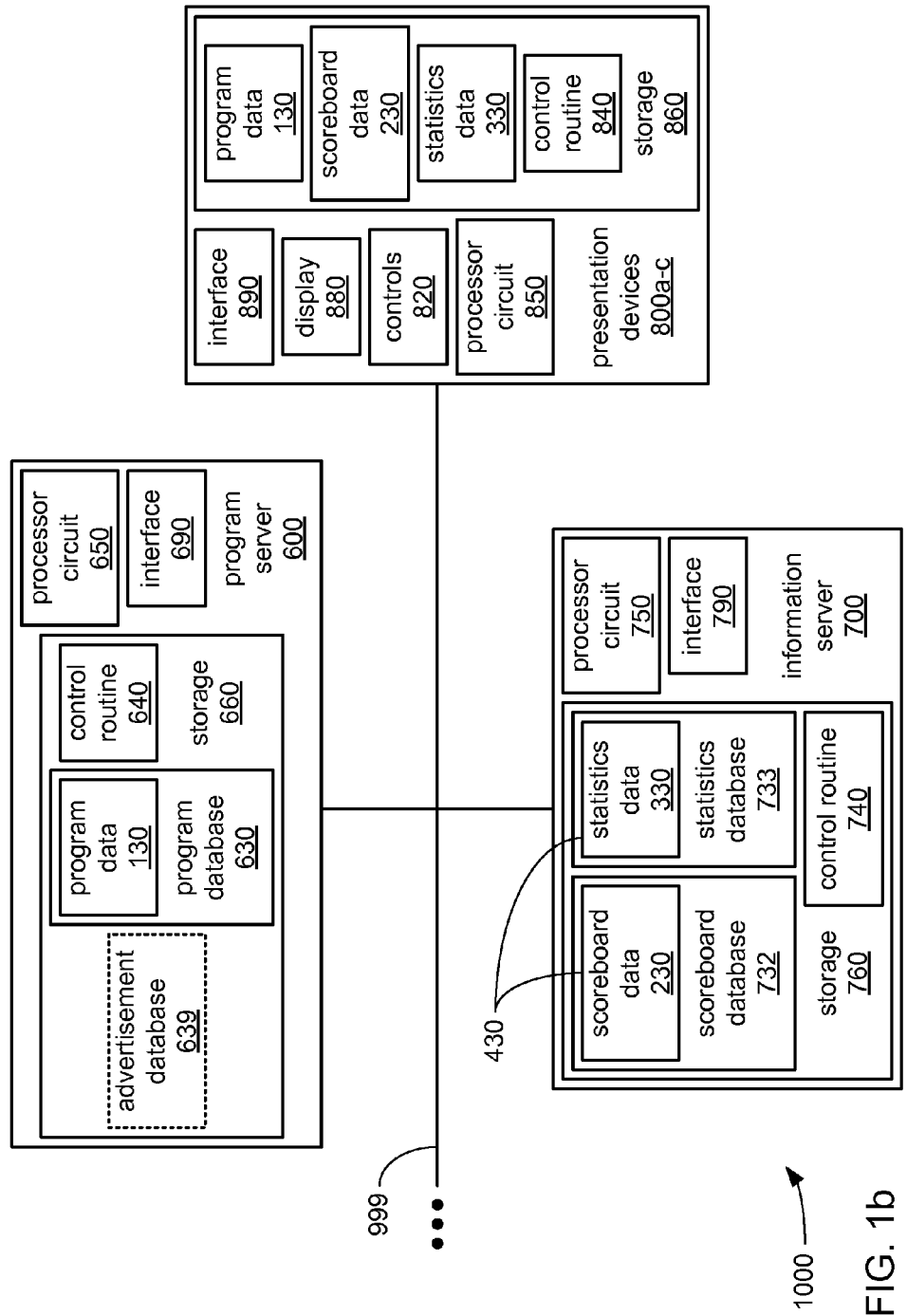

FIGS. 2, 3, 4 and 5, taken together, illustrate block diagrams of portions of the block diagram of the combination of FIGS. 1a and 1b in greater detail. More specifically, aspects of the operating environments of the computing devices 100, 200, 300, 400, 600, 700 and 800a-c are depicted, in which corresponding ones of the processor circuits 150, 250, 350, 450, 650, 750 and 850 (FIGS. 1a-b) are caused by execution of respective control routines 140, 240, 340, 440, 640, 740 and 840 to perform the aforedescribed functions. As will be recognized by those skilled in the art, each of these control routines, including the components of which each is composed, implement logic as a sequence of instructions and are selected to be operative on (e.g., executable by) whatever type of processor or processors are selected to implement each of these processor circuits. Further, it is important to note that despite the depiction in these figures of specific allocations of implementation of logic between hardware and software components and routines made up of instructions, different allocations are possible in other embodiments.

In various embodiments, one or more of the control routines 140, 340, 240, 440, 640, 740 and 840 may comprise a combination of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor circuits 150, 250, 450, 550, 650, 750 and 850, including without limitation, Windows™, OS X™, Linux®, Android OS™, Symbian™, Blackberry® OS, iOS™ and ThreadX®. Where one or more device drivers are included, those device drivers may provide support for any of a variety of other components, whether hardware or software components, that comprise one or more of the computing devices 100, 200, 300, 400, 600, 700 and 800a-c.

Each of the control routines 140, 240, 340, 440, 640, 740 and 840 comprises a communications component 149, 249, 349, 449, 649, 749 and 849, respectively, executable by corresponding ones of the processor circuits 150, 250, 350, 450, 650, 750 and 850 to operate corresponding ones of the interfaces 190, 290, 390, 490, 690, 790 and 890 to transmit and receive signals, possibly via the network 999 as has been described. As will be recognized by those skilled in the art, each of these communications components are selected to be operable with whatever type of interface technology is selected to implement each of the corresponding ones of these interfaces.

Figure 2:
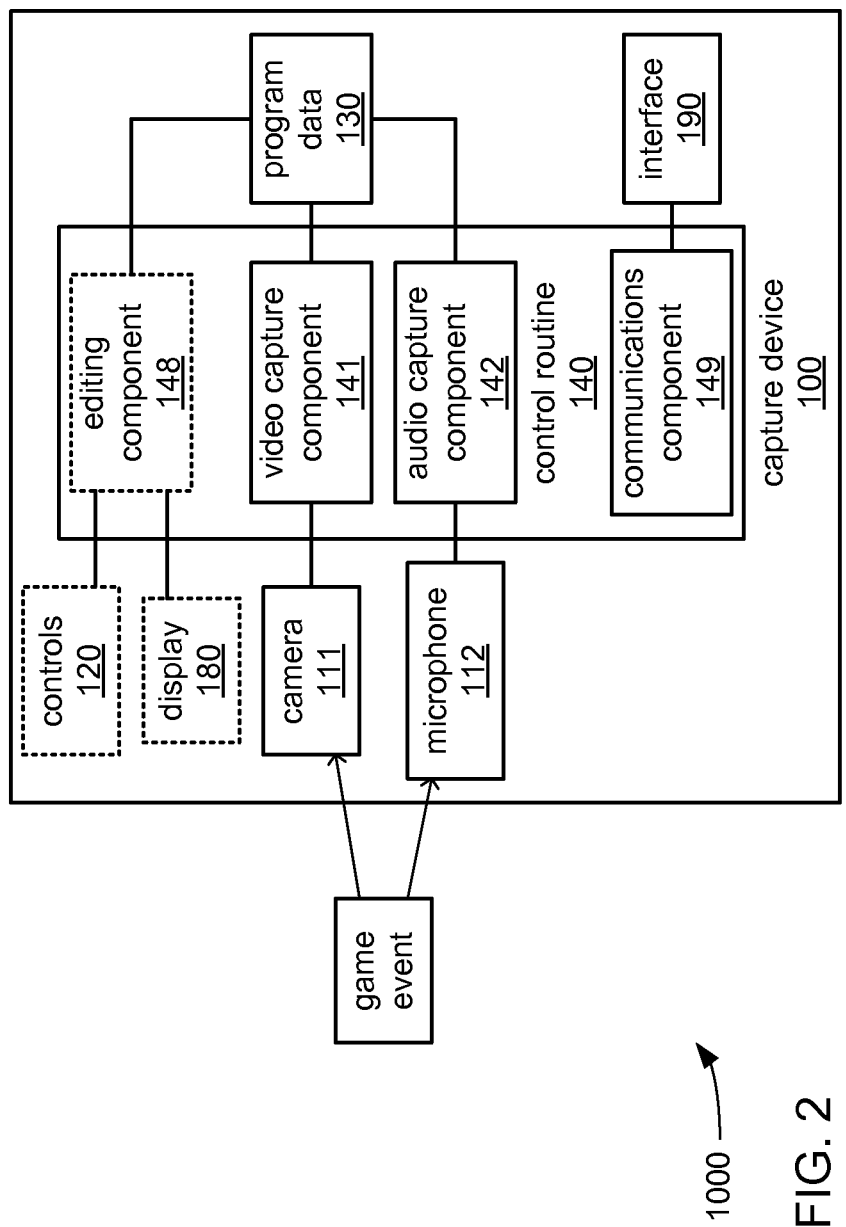
FIGS. 2, 3, 4 and 5 illustrate portions of the embodiment of FIG. 1.

Turning more specifically to FIG. 2, the control routine 140 includes a video capture component 141 and an audio capture component 142 executable by the processor circuit 150 to interact with one or more of the camera 111 and one or more of the microphone 112 to capture video and audio, respectively of the game event, and to store that video and audio in the form of an audio/visual program making up the program data 130. As has been discussed, it is envisioned that the format of the program data 130 is likely to conform to one or more widely accepted audio/visual data format conventions that are not amenable to including such data as timestamping or other notations of when actions related to play of the game event occur. As the audio and video are stored as the program data 130, the processor circuit 150 is also caused to transmit the program data 130 to the program server 600.

Figure 3:
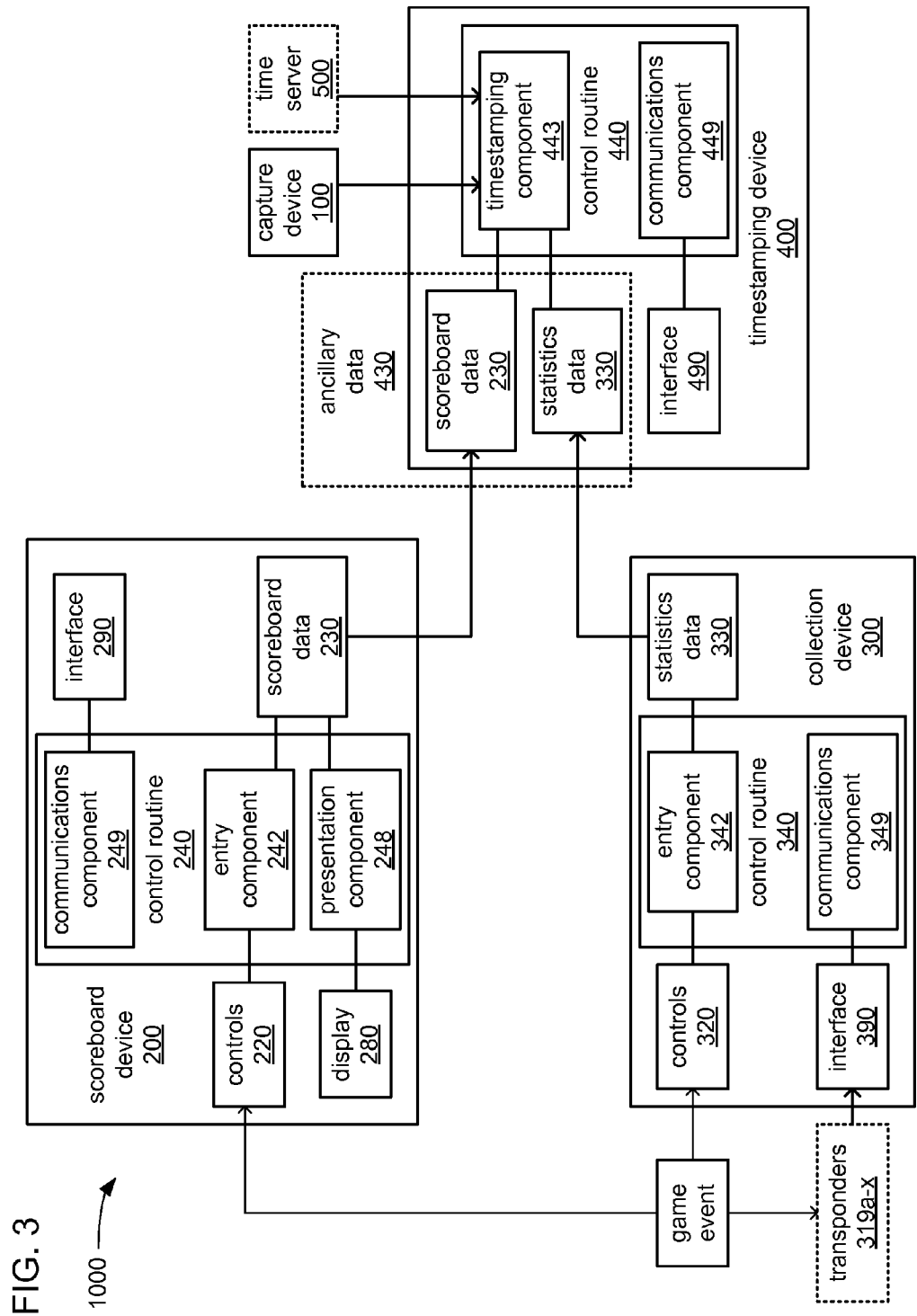

Turning more specifically to FIG. 3, the control routine 240 includes an entry component 242 executable by the processor circuit 250 to interact with the controls 220 to enable receipt of signals arising from entry of scoreboard-related data, such as game scores and/or commands to control official timekeeping, and to store that data as the scoreboard data 230. The control routine 240 also includes a presentation component executable by processor circuit 250 to operate the display 280 to visually present the scoreboard data 230, possibly to an audience in attendance in person at the venue at which the game event occurs. As scoreboard-related data is entered and stored as the scoreboard data 230, the processor circuit 250 is also caused to transmit the scoreboard data 230 to the timestamping device 400.

The control routine 340 includes an entry component 342 executable by the processor circuit 350 to interact with the controls 320 to enable entry of statistics of a game event directly and/or to control aspects of the receipt of signals by a component of the interface 390 from one or more transponders 319a-x (if present) that may accompany the collection device 300. As previously discussed, players, vehicles, goal locations, etc. may be provided with one or more of the transponders 319a-x installed and configured to automate provision of statistics concerning play of a game event to the collection device 300, including laps completed, locations of players and/or vehicles, goals scored, etc. As the statistics are entered or received, and then stored as the statistics data 330, the processor circuit 350 is also caused to transmit the statistics data 330 to the timestamping device 400.

The control routine 440 includes a timestamping component 443 executable by the processor circuit 450 to augment the scoreboard data 230 and the statistics data 330 (which together, make up the ancillary data 430) with timestamps indicating when the various game-related actions indicated within each occurs in relation to one or more milestones of the capture of audio and video of game play as the program data 130 by the capture device 100. The timestamping component receives at least indications of such milestones (e.g., when recording of audio and/or video begins, is paused, is resume, is stopped, etc.) from the capture device 100, and further, may also receive indications of a current time from the time server 500. As the scoreboard data 230 and the statistics data 330 are received and augmented, the processor 450 is also caused to transmit the now augmented variants to the information server 700.

Figure 6:
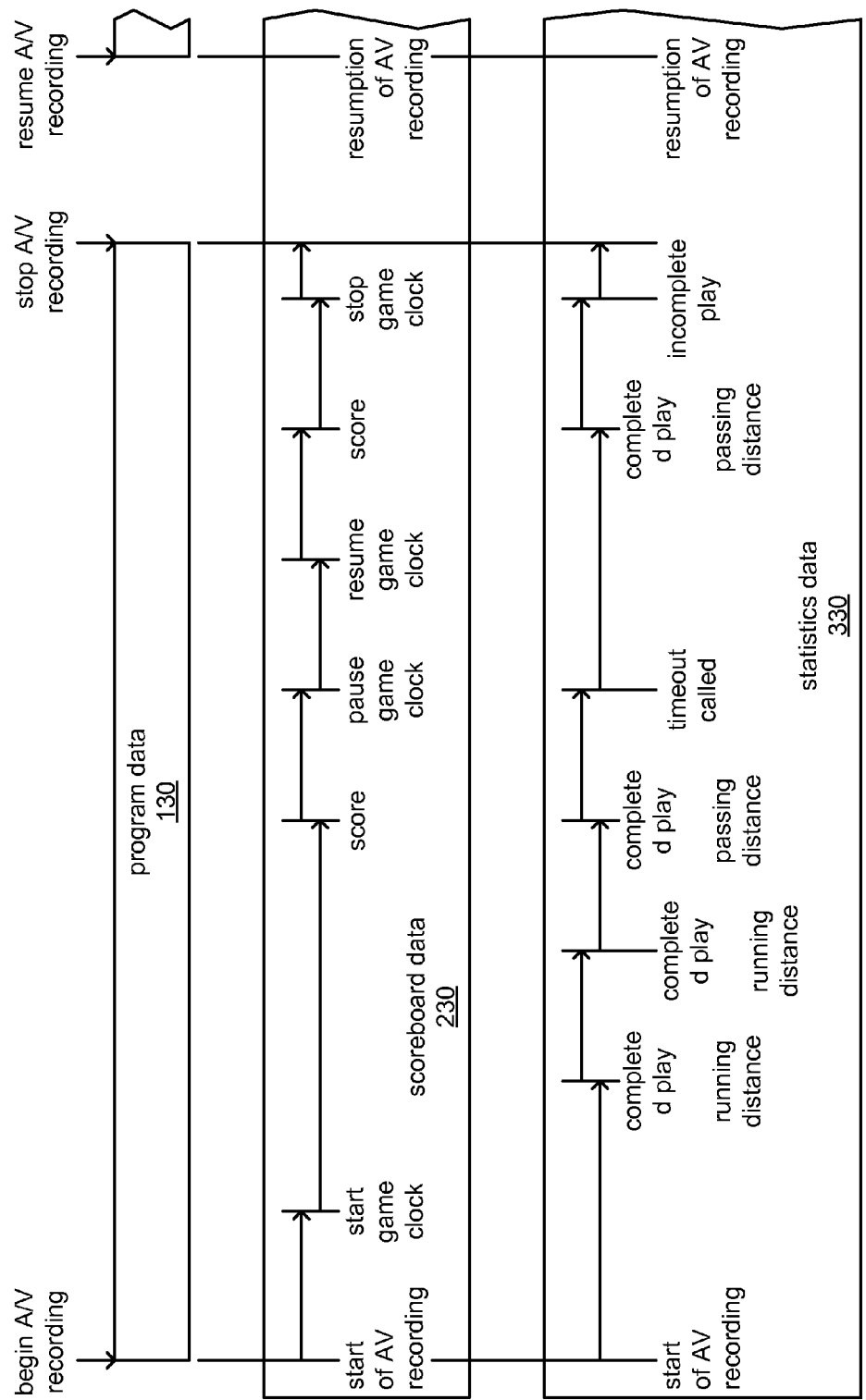
FIG. 6 illustrates an example of timestamping of ancillary data of the embodiment of FIG. 1.

Turning briefly to FIG. 6, an example of the possible timestamping of play-related actions of the game event is depicted. It should be noted that this depicted is highly simplified as it is expected that there would be many more game-related actions occurring during the course of play of almost any game event of almost any variety of game. Advantage is taken of the commonplace practice in media coverage of many types of game events of commencing with recording audio and/or video of a game event for some appreciable amount of time before play begins. Thus, it is envisioned that audio/visual recording leading to the start of creation of the program data 130 will very likely occur before commencement of any game play, and thus, before the occurrence of any action arising from game play that would be indicated in either of the scoreboard data 230 and the statistics data 330.

As has been discussed, commencement of audio/visual recording is a milestone of audio/visual recording, and is communicated by the capture device 100 to the timestamping device 400, which retains an indication of when this milestone of commencement of audio/visual recording occurred. Somewhat later, the official game clock maintained by the scoreboard device 200 is started, and an indication of the occurrence of this game-related action is stored as part of the scoreboard data 230, which is then transmitted to the timestamping device 400. The timestamping device 400 augments the received form of the scoreboard data 230 with a timestamp that indicates the time at which the official game clock was started relative to the start of audio/visual recording making up the program data 130. As depicted, as game play continues, indications of a score, a pausing of the game block, a resumption of the game clock, another score and a stoppage of the game clock (all of which are game-related actions) are also stored as part of the scoreboard data 230 as each action occur, and are transmitted to the timestamping device 400. The timestamping device 400 augments the scoreboard data 230 with timestamps indicating when each of these actions related to play of the game event occurred in relation to a milestone of the recording of audio and/or video, which as depicted in this case, is the milestone of commencement of recording.

In addition to adding of indications of scoreboard actions related to play of the game event to the scoreboard data 230, as well as its augmentation with associated timestamps, there is also the creation and adding of indications of other actions to the statistics data 330, as well as its augmentation with associated timestamps. Specifically, at some time after commencement of audio/visual recording and the occurrence of the scoreboard action of the start of the official game clock, a play is completed in the course of game play of the game event. This leads to storage of an indication of completion of that play (a play-related action) and an indication of a statistic of a distance run by a player in that play as part of the statistics data 330, which is then transmitted to the timestamping device 400. The timestamping device 400 augments the received form of the statistics data 330 with a timestamp that indicates the time at which that play was completed relative to the start of audio/visual recording making up the program data 130. As depicted, as game play continues, indications of another game play completion with a running distance statistic, a game play completion with a passing distance statistic, a calling of a timeout, another game play completion with a passing distance statistic, and an incomplete play (all of which are game-related actions) are also stored as part of the statistics data 330 as each action occurs, and are transmitted to the timestamping device 400. The timestamping device 400 augments the statistics data 330 with timestamps indicating when each of these actions related to play of the game event occurred in relation to a milestone of the recording of audio and/or video, which as depicted in this case, is the milestone of commencement of recording.

As previously discussed, each of these timestamps may indicate time for each action related to game play in terms of an amount of time relative to a milestone of audio/visual recording or in terms of a time relative to a time zone or other widely accepted reference. In the latter case, timestamping of milestones of audio/visual recording would be compared to timestamping of play-related actions to derive amounts of time separating each such action from one or more of such milestones. Regardless of the exact manner in which the timestamps are described, the augmentation of each of the scoreboard data 230 and statistics data 330 with timestamps for each of such milestones and each of such actions enables the subsequent presentation of the scoreboard data 230 and the statistics data 330 to be synchronized with the presentation of the program data 130.

Figure 4:
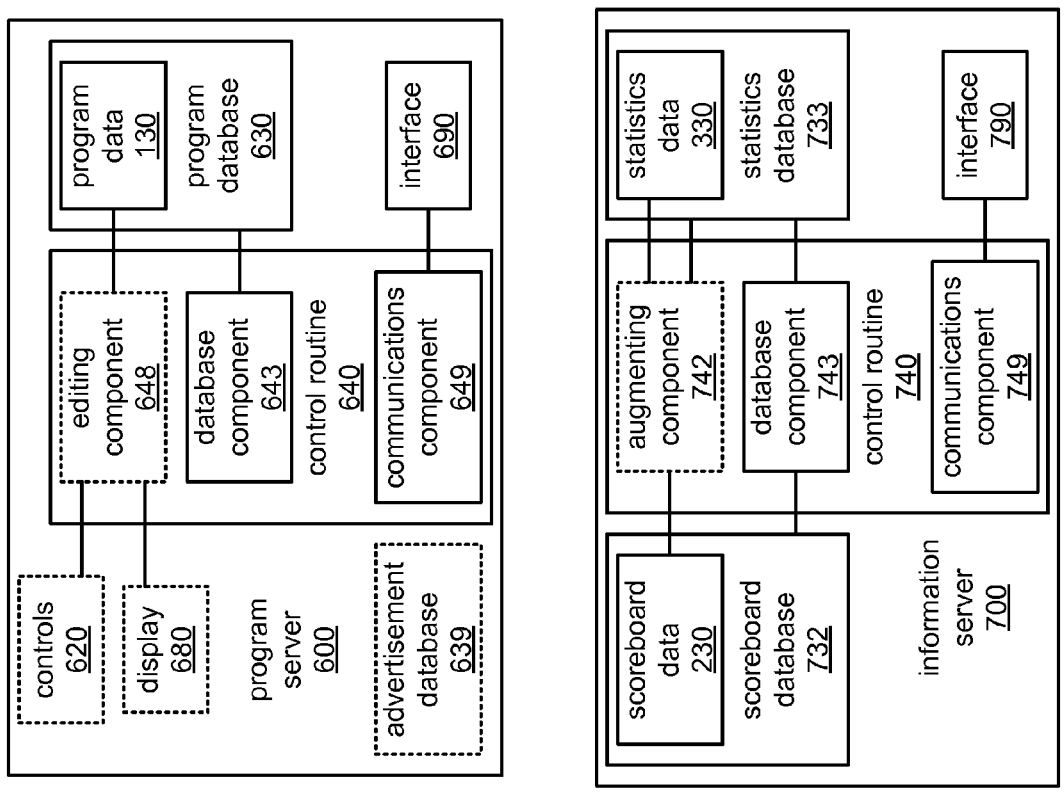

Turning more specifically to FIG. 4, the control routine 640 includes a database component 643 executable by the processor circuit 650 to maintain the program database 630. As has been discussed, the program database 630 is made up of multiple ones of a program data that each correspond to a game event, including the program data 130. Upon receipt of the program data 130 from the capture device 100, the database component 643 stores a copy of it as part of the program database 630 to enable later retransmission (possibly hours, days or weeks after the game event concludes) to one or more of the presentation devices 800a-c. However, where the program data 130 is to be distributed for viewing during play of the game event, the program data 130 may be retransmitted to one or more of the presentation devices 800a-c substantially as the game event occurs, and the storage of the program data 130 as part of the program database 630 may be performed as part of buffering a portion of the program data 130 prior to retransmission.

Referring back briefly to FIG. 2, as well as also to FIG. 4, the capture of audio and video of the game event, especially where there are multiple ones of the camera 111 and/or of the microphone 112, may entail editing to select camera views and/or mixes of audio. Such editing may be done whether the game event is to be presented to viewers as it occurs or time-shifted hours, days or weeks later. Where such editing is to be done at the venue at which the game event occurs, the capture device 100 may incorporate controls 120 and a display 180, and the control routine 140 may incorporate an editing component 148. The editing component 148 interacts with the controls 120 and the display 180 to provide a user interface by which an operator of the capture device 100 accesses the program data 130 as sights and sounds of the game event are captured to select camera views and/or mixes of what may be audio from multiple ones of the microphone 112 positioned at different locations of the venue and/or carried by different persons to enable their provision of voice commentary about the game event. In this way, the editing component 148 may be employed to pare down what camera views and/or mixes of audio are to remain part of the form of the program data 130 that is transmitted to the program server 600 for storage and retransmission.

Alternatively, where such editing is to be done away from the venue at which the game event occurs, the program server 600 may incorporate controls 620 and a display 680, and the control routine 640 may incorporate an editing component 648. The editing component 648 interacts with the controls 620 and the display 680 to provide a user interface by which an operator of the program server 600 accesses the program data 130 as stored in the program database 630 to select camera views and/or mixes of what may be audio from multiple ones of the microphone 112 positioned at different locations of the venue and/or carried by different persons to enable their provision of voice commentary about the game event. In support of this, the program data 130, as received from the capture device 100, would include separate streams of captured audio and video conveyed in parallel from the captured device 100 to the program server 600 to enable such editing at a location elsewhere than at the venue. Thus, a paring down of what camera views and captured audio is ultimately provided in a form of the program data 130 that is retransmitted to one or more of the presentation devices 800a-c is performed subsequent to the program server 600 receiving a fuller form of the program data 130 from the capture device 100. It should also be noted that, rather than the program server 600 being directly operated to perform such editing on the program data 130 as stored within the program server 600, another computing device (not shown) may be coupled to the program server 600 (possibly via the network 999) to provide a user interface by which the program data 130 may be edited following receipt in such a fuller form by the program server 600.

Returning more specifically to FIG. 4, the control routine 740 includes a database component 743 executable by the processor circuit 750 to maintain both of the scoreboard database 732 and the statistics database 733. As has been discussed, the scoreboard database 732 is made up of multiple ones of a scoreboard data that each correspond to a game event, including the scoreboard data 230. As has also been discussed, the statistics database 733 is made up of multiple ones of a statistics data that each correspond to a game event, including the statistics data 330. Upon receipt of the scoreboard data 230 and the statistics data 330 from the timestamping device 400, the database component 743 stores a copy of each as part of the scoreboard database 732 and the statistics database 733, respectively, to enable later retransmission (possibly hours, days or weeks after the game event concludes) to one or more of the presentation devices 800a-c. However, where the scoreboard data 230 and the statistics data 330 are to be distributed for viewing during play of the game event, both may be retransmitted to one or more of the presentation devices 800a-c substantially as the game event occurs, and the storage of the scoreboard data 230 as part of the scoreboard database 732 and the storage of the statistics data 330 as part of the statistics database 733 may be performed as part of buffering a portion of each prior to retransmission.

The control routine 740 may further incorporate an augmenting component 742 executable by the processor circuit 750 to first parse the indications of play-related actions occurring during play of the game event in one or both of the scoreboard data 230 and the statistics data 330, and then search the statistics database 733 for other statistical information related to teams and/or players at the game event, the venue, or more generally to the history of the game played. Upon identifying such other statistical information, the augmenting component 742 may augment the statistics data 330 with indications of such statistical information correlated to one or more of the indications of actions of the game event. By way of example, where the statistics data 330, as received by the information server 700, included an indication of a particular player throwing a ball a specific distance at a particular time indicated by a timestamp added by the timestamping device 400, the processor circuit 750 may further add an indication of the total distance that the particular player has thrown balls throughout a current season. In this way, the statistics data 330 is caused to include additional information tied to one or more particular actions occurring within the game event that add a larger perspective to each of those particular actions.

Figure 5:
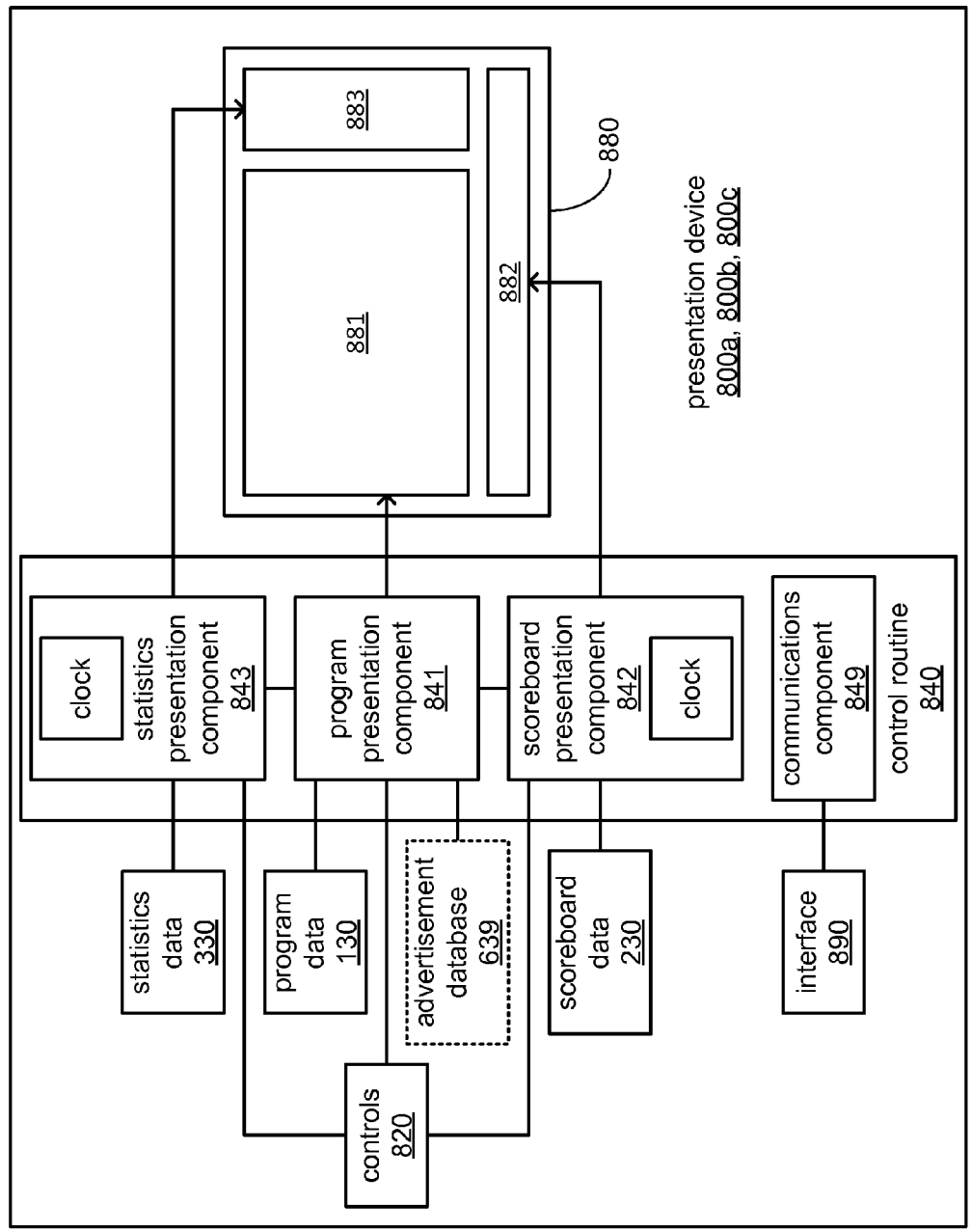

Turning more specifically to FIG. 5, the control routine 840 comprises a program presentation component 841, a scoreboard presentation component 842, and a statistics presentation component 843 to visually present the program data 130, the scoreboard data 230 and the statistics data 330 on the display 880 in a synchronized manner. As those skilled in the art of transfer of data in the typically packet-based manner commonly employed in networks, including the Internet, it is common for packets of data transmitted in a given order from one location to be received in a different order at another location, and it is common for packets of different pieces of data transmitted at substantially the same time to be received in a manner in which packets of one of the pieces of data arrive with an appreciable delay compared as compared to packets of another of the pieces of data. Thus, the relative timing and order in which each of the program data 130, the scoreboard data 230 and the statistics data 330 are received by any of the presentation devices 800a-c cannot be relied upon to guide the timing of the visual presentation of their contents on the display 880.

The program presentation component 841 provides indications of when visual presentation of the program data 130 commences, and from what point in the program data 130 relative to the beginning and/or the end of the recording of audio or video to enable the scoreboard presentation component 842 and the statistics presentation component 843 to synchronize their visual presentations of the scoreboard data 230 and the statistics data 330, respectively. Again, it is envisioned that the format of the program data 130 is to be such that the inclusion of timestamps indicating when play-related actions (including starting of official timekeeping) in the program data 130 is not supported. Thus, again, milestones indicative of when recording of sights and sounds of the game event begin, are paused, are resumed and/or stopped are employed to enable the presentation of the scoreboard data 230 and the statistics data 330 to be synchronized to the presentation of the program data 130.

Upon receipt of the indication when visual presentation of the program data 130 commences and from what point in the program data 130 relative to the beginning and/or end of its recording, each of the scoreboard presentation component 842 and the statistics presentation component 843 synchronize a clock (despite the depiction of separate clocks, there may be single common clock) to the beginning of presentation of the program data 130 at that point. Then, throughout the visual presentation of the program data 130, the scoreboard presentation component 842 runs and uses its clock and the timestamps in the scoreboard data 230 to time the visual presentation of each of the corresponding play-related actions indicated in the scoreboard data 230 to coincide with the presentation of each of those actions from the program data 130 by the program presentation component 841. Thus, for example, as completion of a play resulting in a score is visually presented on the display 880 from video of the program data 130, the change in score for that team or player resulting from that completed play and indicated in the scoreboard data 230 is also visually presented on the display 880, and in a synchronized manner.

Similarly, throughout the visual presentation of the program data 130, the statistics presentation component 843 runs and uses its clock and the timestamps in the statistics data 330 to time the visual presentation of each of the corresponding play-related actions indicated in the statistics data 330 to coincide with the presentation of each of those actions from the program data 130 by the program presentation component 841. Thus, for example, as completion of a play including a player throwing a ball a specific distance is visually presented on the display 880 from video of the program data 130, the distance by which the ball was thrown by that player in that completed play and indicated in the statistics data 330 is also visually presented on the display 880, and in a synchronized manner. Further, as has been discussed, the statistics data 330 may have been augmented by the information server 700 with additional statistics data associated with one or more of the play-related actions indicated in the statistics data 330. Thus, the visual display of the distance by which that ball was thrown by that player may be accompanied by a visual presentation of the total distance of all throws of a ball by that player throughout a season of the game.

As also depicted in FIG. 5, the visual presentations of program data 130, the scoreboard data 230 and the statistics data 330 occur in separate portions 881, 882 and 883, respectively, of the display area of the display 880. This enables the visual presentation of the sights of the game event in the portion 881 without overlays and/or without cutaways to visually present either of the scoreboard data 230 or the statistics data 330. As typical displays of computing devices continue to become larger in physical size and capable of displaying video at resolutions exceeding the resolutions at which game events are recorded, displaying such ancillary data 430 (e.g., the scoreboard data 230 and the statistics data 330) in other portions of the display area of the display 880 makes more effective use of such a display 880, and allows more of the full resolution of such video to be visually presented unencumbered.

In some embodiments in which one or more of the presentation devices 800a-c also incorporate the controls 820, these presentation components 841, 842 and 843 may employ the controls 820 and the display 880 to provide a user interface enabling the use of one or more of the presentation devices 800a-c to interact with one or the other of the program server 600 and the information server 700 via the network 999. More specifically, functionality akin to a web browser or terminal emulator may be provided on one or more of the presentation devices 800a-c that enables a user to access one or the other of these servers to select a game event for presentation.

Figure 7:
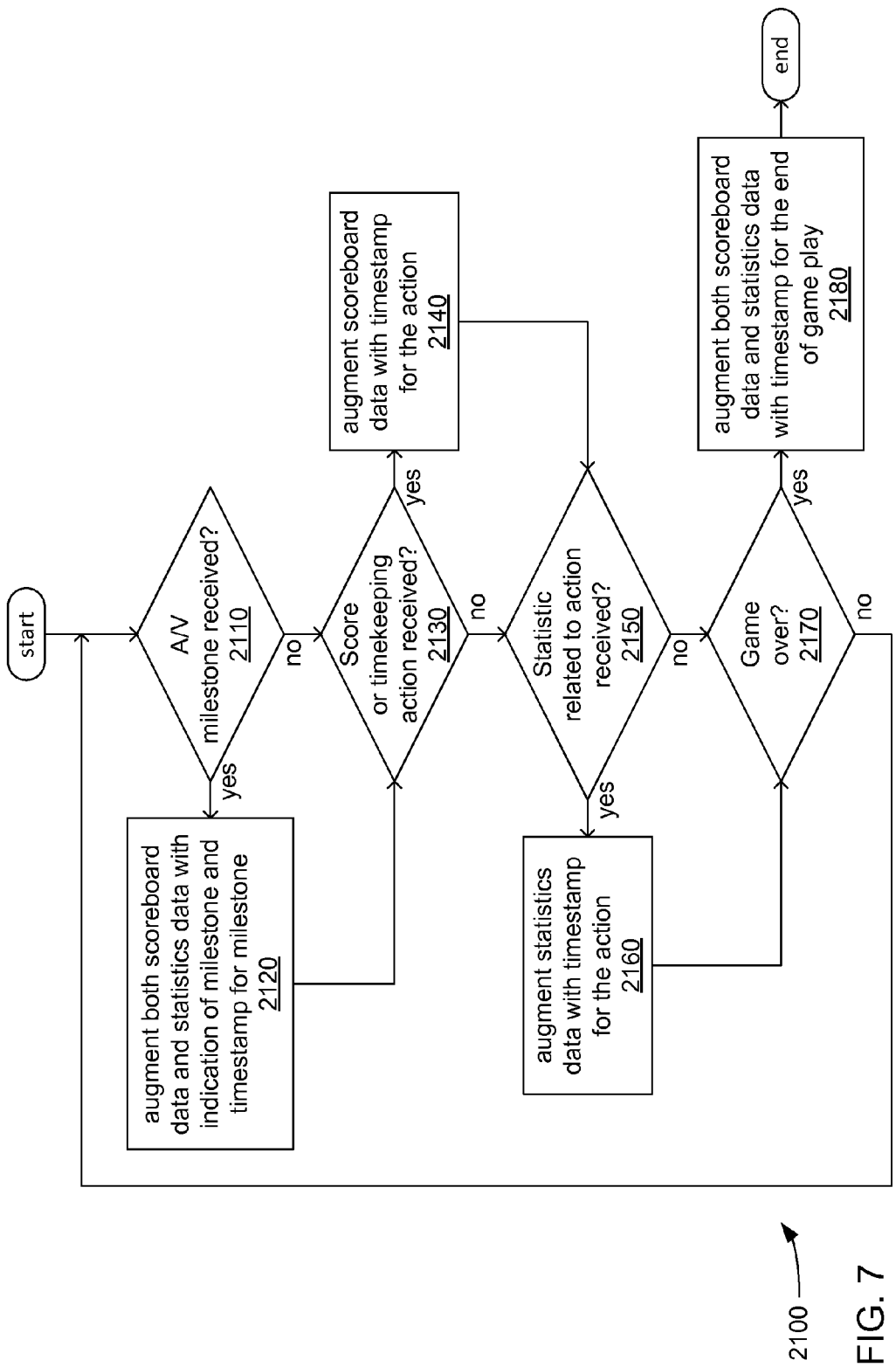
FIG. 7 illustrates an embodiment of a first logic flow.

FIG. 7 illustrates an embodiment of a logic flow 2100. The logic flow 2100 may be representative of some or all of the operations executed by one or more embodiments described herein. More specifically, the logic flow 2100 may illustrate operations performed by components of the timestamping device 400, including the processor circuit 450 in executing at least the control routine 440 and/or other components of the timestamping device 400.

At 2110, a check is made as to whether a computing device (e.g., the timestamping device 400) has received an indication of a milestone in the recording of audio and/or video of a game event. If not, then a next check occurs at 2130. If so, then an indication of the milestone is added to both scoreboard data (e.g., the scoreboard data 230) and statistics data (e.g., the statistics data 330) associated with the game event, and that indication in each of the scoreboard and statistics data of the milestone is accompanied with a timestamp indicating when that milestone occurred at 2120, before the next check occurs at 2130. As has been discussed, it is common practice for recordation of audio and video of a game event to begin before actual play of the game event, such that it is envisioned that a milestone marking the beginning of the recording of audio and video as a program data (e.g., the program data 130) will precede any indications of play-related actions in either of the scoreboard or statistics data. As has been discussed at length, the inclusion of indications of such milestones in the scoreboard and statistics data accompanied by timestamps enables later synchronization of the presentation of all three of the program, scoreboard and statistics data.

At 2130, a check is made as to whether an indication of a score or timekeeping action related to play of the game event has been received in the scoreboard data received from a scoreboard device (e.g., the scoreboard device 200) or another computing device involved in the keeping of score and/or official timekeeping of the game event. If not, then a next check occurs at 2150. If so, then the indication of score or timekeeping action in the scoreboard data is augmented with a timestamp indicating when the action occurred.

At 2150, a check is made as to whether an indication of a statistic associated with an action in the play of the game event has been received in the statistics data received from a collection device (e.g., the collection device 300) or another computing device involved in the entry of indications of play-related actions and associated statistics of the game event. If not, then a next check occurs at 2170. If so, then the indication of a statistic associated with a play-related action in the statistics data is augmented with a timestamp indicating when the action occurred.

At 2170, a check is made as to whether play of the game event has ended. If not, then the check at 2110 is repeated. If so, then a timestamp indicated when play ended is added to both the scoreboard and statistics data at 2180.

Figure 8:
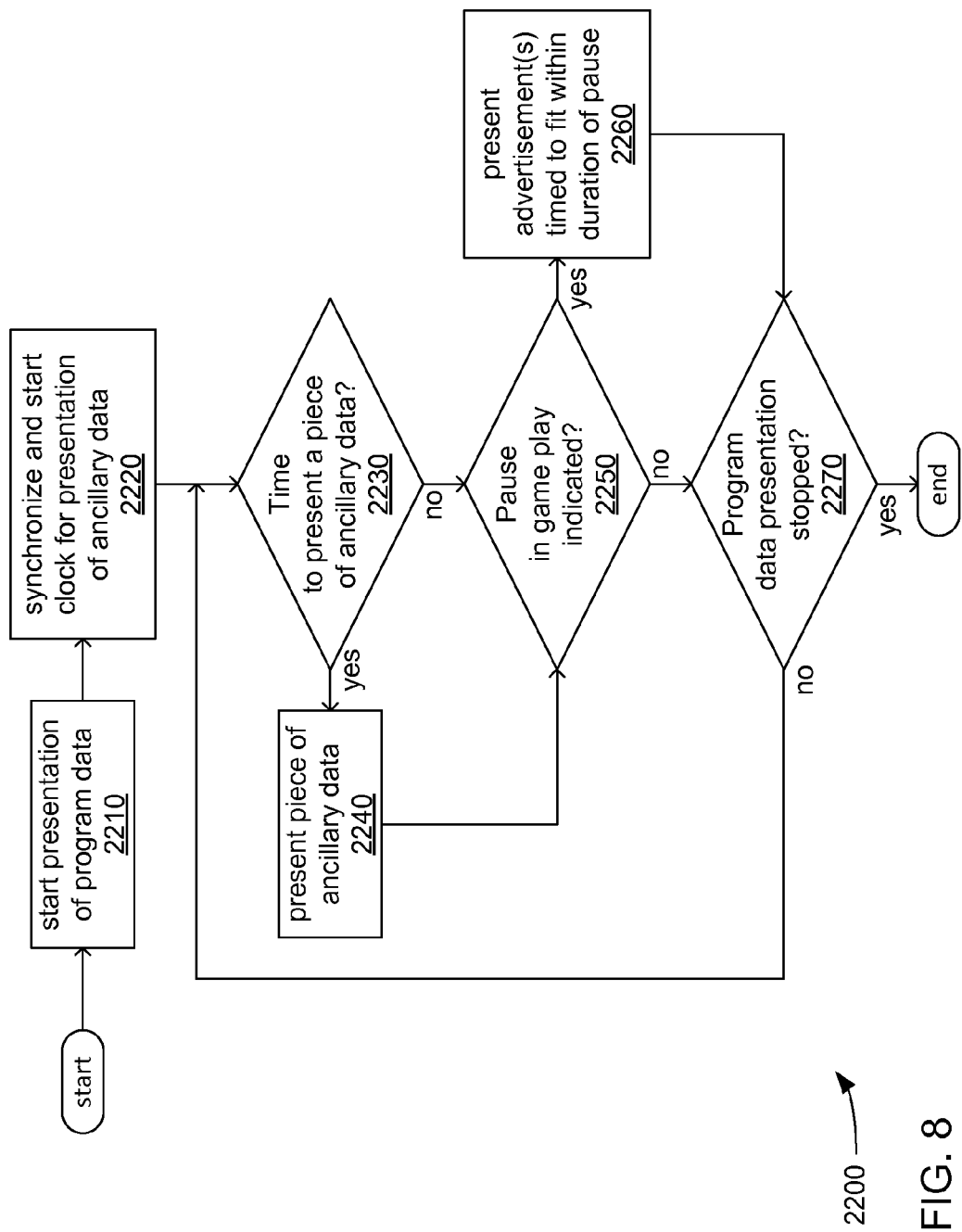
FIG. 8 illustrates an embodiment of a second logic flow.

FIG. 8 illustrates an embodiment of a logic flow 2200. The logic flow 2200 may be representative of some or all of the operations executed by one or more embodiments described herein. More specifically, the logic flow 2200 may illustrate operations performed by components of one of the presentation devices 800a-c, including the processor circuit 850 in executing at least the control routine 840 and/or other components of one of these presentation devices.

At 2210, a presentation device (e.g., one of the presentation devices 800a-c) begins visual presentation of the audio/visual program of a game event of a program data (e.g., the program data 130) in one portion of the display area of a display of the presentation device (e.g., the portion 881 of the display area of the display 880). As has been previously discussed, a presentation device receives packets of the program data and packets of ancillary data (e.g., the ancillary data 430 made up of one or both of the scoreboard data 230 and the statistics data 330) separately via a network such that the timing and ordering by which those packets arrive cannot be used as a basis to synchronize presentation of the information within them.

At 2220, the presentation device synchronizes and starts a clock for timing the presentation of the ancillary data. As previously discussed, the ancillary data is made up of indications of actions occurring during play of the game event, accompanied by timestamps indicating when those actions occurred relative to one or more milestones of the audio/visual recording of the game event conveyed in the program data. The ancillary data also includes at least one timestamp indicating when one of those milestones occurred, such as the starting, stopping, pausing or resuming of audio/visual recording of the game event.

At 2230, a check is made as to whether a time has yet arrived to visually present a piece of ancillary data alongside the visual presentation of the program data. If not, then a next check is made at 2250. If so, then at 2240, a piece of ancillary data made up of an indication of an action related to play of the game event (e.g., a change in score, a distance thrown or run, a timeout, a resumption of an official game clock, a goal, a crossing of a finish line, a checkmate, a play of a card, etc.) is visually presented in another portion of the display area of the display of the presentation device (e.g., one of the portions 882 or 883 of the display area of the display 880).

At 2250, a check is made as to whether a pause in the play of the game event is indicated in the ancillary data as having occurred. If not, then a next check is made at 2270. If so, then at 2260, the presentation device may visually present one or more advertisements on the display, possibly using the portion on which the program data has been visually presented. The presentation of the one or more advertisements may be timed to last only as long as the ancillary data indicates that the pause in the play of the game event lasts, that duration determined from the difference in time between the timestamp associated with the indication of the pause in play and the timestamp associated with a subsequent indication of resumption in play.

At 2270, a check is made as to whether visual presentation of the program data has stopped, either due to the end of the audio and video of the program data having been reached or due to an action of an operator of the presentation device (e.g., operation of the controls 820) having caused cessation of that presentation. If no such stoppage of presentation has occurred, then the check at 2230 is repeated.

Figure 9:
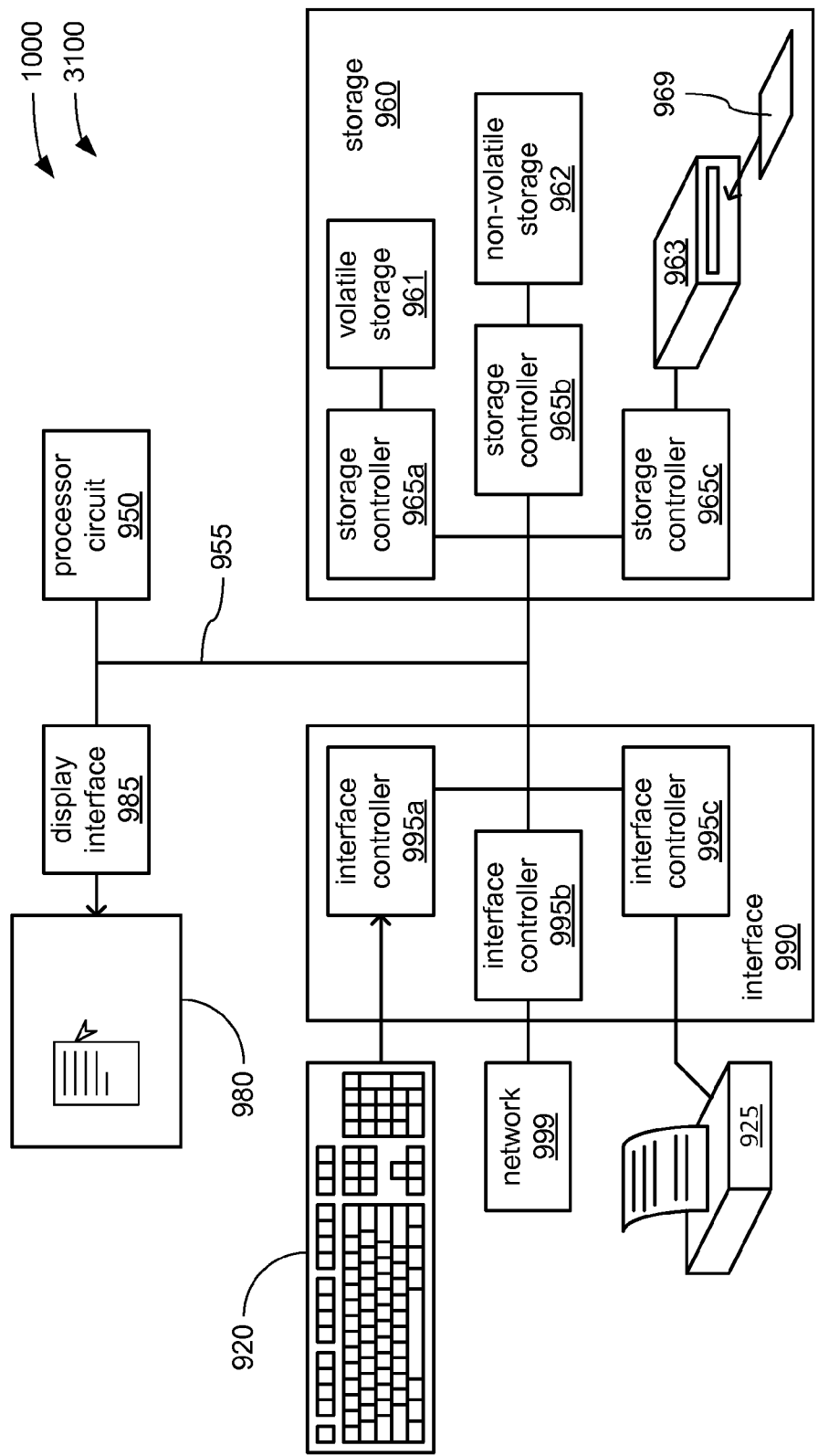
FIG. 9 illustrates an embodiment of a processing architecture.

FIG. 9 illustrates an embodiment of an exemplary processing architecture 3100 suitable for implementing various embodiments as previously described. More specifically, the processing architecture 3100 (or variants thereof) may be implemented as part of one or more of the computing devices 100, 200, 300, 400, 600, 700 and 800*a*-*c*. It should be noted that components of the processing architecture 3100 are given reference numbers in which the last two digits correspond to the last two digits of reference numbers of components earlier depicted and described as part of each of these computing devices. This is done as an aid to correlating such components of whichever ones of these computing devices may employ this exemplary processing architecture in various embodiments.

The processing architecture 3100 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor circuit, the processor circuit itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. Each message may be a signal or a plurality of signals transmitted either serially or substantially in parallel.

As depicted, in implementing the processing architecture 3100, a computing device comprises at least a processor circuit 950, a storage 960, an interface 990 to other devices, and coupling 955. As will be explained, depending on various aspects of a computing device implementing the processing architecture 3100, including its intended use and/or conditions of use, such a computing device may further comprise additional components, such as without limitation, a display interface 985.

Coupling 955 is comprised of one or more buses, point-to-point interconnects, transceivers, buffers, crosspoint switches, and/or other conductors and/or logic that communicatively couples at least the processor circuit 950 to the storage 960. Coupling 955 may further couple the processor circuit 950 to one or more of the interface 990 and the display interface 985 (depending on which of these and/or other components are also present). With the processor circuit 950 being so coupled by couplings 955, the processor circuit 950 is able to perform the various ones of the tasks described at length, above, for whichever ones of the computing devices 100, 200, 300, 400, 600, 700 or 800*a*-*c* implement the processing architecture 3100. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor circuit 950 (corresponding to one or more of the processor circuits 150, 350, 250, 450, 650, 750 or 850) may comprise any of a wide variety of commercially available processors, employing any of a wide variety of technologies and implemented with one or more cores physically combined in any of a number of ways.

As previously discussed, the storage 960 (corresponding to one or more of the storages 160, 260, 360, 460, 660, 760 or 860) may comprise one or more distinct storage devices based on any of a wide variety of technologies or combinations of technologies. More specifically, as depicted, the storage 960 may comprise one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly comprising multiple distinct types of storage is in recognition of the commonplace use of more than one type of storage device in computing devices in which one type provides relatively rapid reading and writing capabilities enabling more rapid manipulation of data by the processor circuit 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and comprises one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and comprises one or more optical and/or solid-state disk drives employing one or more pieces of machine-readable storage media 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage media 969.

One or the other of the volatile storage 961 or the non-volatile storage 962 may comprise an article of manufacture in the form of a machine-readable storage media on which a routine comprising a sequence of instructions executable by the processor circuit 950 may be stored, depending on the technologies on which each is based. By way of example, where the non-volatile storage 962 comprises ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to removable storage media such as a floppy diskette. By way of another example, the non-volatile storage 962 may comprise banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor circuit 950 may initially be stored on the machine-readable storage media 969, and the removable media storage 963 may be subsequently employed in copying that routine to the non-volatile storage 962 for longer term storage not requiring the continuing presence of the machine-readable storage media 969 and/or the volatile storage 961 to enable more rapid access by the processor circuit 950 as that routine is executed.

As previously discussed, the interface 990 (corresponding to one or more of the interfaces 190, 290, 390, 490, 690, 790 and 890) may employ any of a variety of signaling technologies corresponding to any of a variety of communications technologies that may be employed to communicatively couple a computing device to one or more other devices. Again, one or both of various forms of wired or wireless signaling may be employed to enable the processor circuit 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as comprising multiple different interface controllers 995a, 995b and 995c. The interface controller 995a may employ any of a variety of types of wired digital serial interface or radio frequency wireless interface to receive serially transmitted messages from user input devices, such as the depicted keyboard 920 (perhaps corresponding to one or more of the controls 120, 420, 620 and 720). The interface controller 995b may employ any of a variety of cabling-based or wireless signaling, timings and/or protocols to access other computing devices through the depicted network 999 (perhaps a network comprising one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually comprises) a display (e.g., the depicted example display 980, corresponding to one or more of the displays 180, 280, 680 and 880), such a computing device implementing the processing architecture 3100 may also comprise the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the devices 100, 200, 300, 400, 600, 700 and 800a-c may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

An example of an apparatus includes a processor circuit and logic to receive an indication of a milestone in recordation of video of a game event, augment an ancillary data with a first timestamp that indicates when the milestone occurred, and augment the ancillary data with a second timestamp that indicates when an action related to play of the game occurred.

The above example of an apparatus in which the logic is to receive an indication of a current time from a time server; synchronize a clock to the current time; and use a first time indicated by the clock in the first timestamp and use a second time indicated by the clock in the second timestamp.

Either of the above examples of an apparatus in which the logic is to synchronize a clock to the milestone, and use an amount of time indicated by the clock as elapsed since the milestone in the second timestamp.

Any of the above examples of an apparatus in which the logic is to transmit the ancillary data to another computing device to enable synchronized visual presentation of the ancillary data alongside a program data comprising the video of the game event.

Any of the above examples of an apparatus in which the game event includes one of a sporting event, a television game show, a board game, and a card game.

Any of the above examples of an apparatus in which the milestone includes one of a start, a pause, a resumption and a stoppage of the recordation of video of the game event.

Any of the above examples of an apparatus in which the ancillary data includes a scoreboard data, and the action comprising one of a change in official timekeeping of the game event and a change in score.

Any of the above examples of an apparatus in which in which the ancillary data includes a statistics data of a play of the game event.

An example of a computer-implemented method includes receiving an indication of a milestone in recordation of video of a game event, augmenting a scoreboard data with a first timestamp that indicates when the milestone occurred, and augmenting the ancillary data with a second timestamp that indicates when an action related to scoring of the game occurred.

The above example of a computer-implemented method in which the method includes augmenting a statistics data with a third timestamp that indicates when the milestone occurred, and augmenting the statistics data with a fourth timestamp that indicates when an action related to play of the game occurred.

Either of the above examples of a computer-implemented method in which the method includes receiving an indication of a current time from a time server, synchronizing a clock to the current time, and using a first time indicated by the clock in the first timestamp and using a second time indicated by the clock in the second timestamp.

Any of the above examples of a computer-implemented method in which the method includes synchronizing a clock to the milestone, and use an amount of time indicated by the clock as elapsed since the milestone in the second timestamp.

Any of the above examples of a computer-implemented method in which the game event includes one of a sporting event, a television game show, a board game, and a card game.

Any of the above examples of a computer-implemented method in which the milestone includes one of a start, a pause, a resumption and a stoppage of the recordation of video of the game event.

An example of another apparatus includes a display; a processor circuit; and logic to receive a program data comprising a video recording of a game event, receive an ancillary data comprising an indication of an action related to play of the game event, a first timestamp indicating a first time associated with a start of the video recording, and a second timestamp indicating a second time associated with the action, visually present the video recording in a first portion of a display area of the display, and use the first and second timestamps to synchronize a visual presentation of the action in a second portion of the display area of the display with a depiction of the action in the visual presentation of the video recording.

The above example of another apparatus in which the logic is to visually present an advertisement in response to an indication of a pause in play of the game event in the ancillary data, and use a third timestamp associated with the indication of the pause to synchronize the visual presentation of the advertisement with a visible indication of the pause in the video recording.

Either of the above examples of another apparatus in which the logic is to time the visual presentation of the advertisement to occur within a period of time determined from a difference in times indicated between the third timestamp and a fourth timestamp associated with an indication of a resumption of play of the game event in the ancillary data.

Any of the above examples of another apparatus in which the logic is to visually present the advertisement in the first portion.

Any of the above examples of another apparatus in which the second portion of the display area does not overlap the first portion.

Any of the above examples of another apparatus in which the game event includes one of a sporting event, a television game show, a board game, and a card game.

Any of the above examples of another apparatus in which the ancillary data includes a scoreboard data, and the action includes one of a change in official timekeeping of the game event and a change in score.

Any of the above examples of another apparatus in which the ancillary data includes a statistics data of a play of the game event.

An example of at least one machine-readable storage medium includes instructions that when executed by a computing device, cause the computing device to receive a program data comprising a video recording of a game event; receive a scoreboard data comprising an indication of an action related to play of the game event, a first timestamp indicating a first time associated with a start of the video recording, and a second timestamp indicating a second time associated with the action; visually present the video recording in a first portion of a display area of a display of the computing device; and use the first and second timestamps to synchronize a visual presentation of the action in a second portion of the display area of the display with a depiction of the action in the visual presentation of the video recording.

The above example of at least one machine-readable storage medium in which the computing device is caused to visually present an advertisement in response to an indication of a pause in play of the game event in the ancillary data and use a third timestamp associated with the indication of the pause to synchronize the visual presentation of the advertisement with a visible indication of the pause in the video recording.

Either of the above examples of at least one machine-readable storage medium in which the computing device is caused to time the visual presentation of the advertisement to occur within a period of time determined from a difference in times indicated between the third timestamp and a fourth timestamp associated with an indication of a resumption of play of the game event in the ancillary data.

Any of the above examples of at least one machine-readable storage medium in which the computing device is caused to visually present the advertisement in the first portion.

Any of the above examples of at least one machine-readable storage medium in which the game event includes one of a sporting event, a television game show, a board game, and a card game.

The invention claimed is:

1. A synchronized presentation apparatus comprising:
   a processor circuit; and
   logic to:
      receive an indication of a milestone associated with a video recordation process of a game event;
      synchronize a clock to the milestone;
      augment, at a timestamping device, an ancillary data with a first timestamp that indicates when the milestone occurred;
      augment, at the timestamping device, the ancillary data with a second timestamp that indicates an amount of time indicated by the clock as elapsed since the milestone when an action related to play of the game event occurred relative to the first timestamp; and
      transmit the augmented ancillary data and program data, comprising video of the game event, to a presentation device, in response to a request from the presentation device received after the game event has concluded, for visual presentation of the ancillary data alongside visual presentation of the program data synchronized according to the timestamps.

2. The apparatus of claim 1, the logic to:
   receive an indication of a current time from a time server;
   synchronize the clock to the current time; and
   use a first time indicated by the clock in the first timestamp and use a second time indicated by the clock in the second timestamp.

3. The apparatus of claim 1, the game event comprising one of a sporting event, a television game show, a board game, and a card game.

4. The apparatus of claim 1, the milestone comprising one of a start, a pause, a resumption and a stoppage of the recordation of video of the game event.

5. The apparatus of claim 1, the ancillary data comprising a scoreboard data, and the action comprising one of a change in official timekeeping of the game event and a change in score.

6. The apparatus of claim 1, the ancillary data comprising a statistics data of a play of the game event.

7. A computer-implemented method of a synchronized presentation system comprising:
   receiving, by a processor circuit of a timestamping device, an indication of a milestone associated with a video recordation process of a game event;
   synchronizing a clock to the milestone;

augmenting, by the processor circuit of the timestamping device, a scoreboard data with a first timestamp that indicates when the milestone occurred;

augmenting, by the processor circuit of the timestamping device, the scoreboard data with a second timestamp that indicates an amount of time indicated by the clock as elapsed since the milestone when an action related to scoring of the game occurred relative to the first timestamp; and transmitting the augmented scoreboard data and program data, comprising video of the game event, to a presentation device, in response to a request from the presentation device received after the game event has concluded, for visual presentation of the scoreboard data alongside visual presentation of the program data synchronized according to the timestamps.

8. The computer-implemented method of claim 7, the method comprising:

augmenting a statistics data with a third timestamp that indicates when the milestone occurred; and augmenting the statistics data with a fourth timestamp that indicates when an action related to play of the game occurred.

9. The computer-implemented method of claim 7, the method comprising:

receiving an indication of a current time from a time server;

synchronizing the clock to the current time; and using a first time indicated by the clock in the first timestamp and using a second time indicated by the clock in the second timestamp.

10. The computer-implemented method of claim 7, the game event comprising one of a sporting event, a television game show, a board game, and a card game.

11. The computer-implemented method of claim 7, the milestone comprising one of a start, a pause, a resumption and a stoppage of the recordation of video of the game event.

12. A synchronized presentation apparatus comprising:
a display;
a processor circuit; and
logic to:
receive an indication of a current time from a time server;
synchronize a clock to the current time;
receive a program data comprising a video recording of a game event;
receive an ancillary data comprising an indication of an action related to play of the game event, a first timestamp indicating a first time indicated by the clock associated with a start of the video recording, and a second timestamp indicating a second time indicated by the clock associated with the action relative to the first timestamp;
visually present, at a presentation device, the video recording in a first portion of a display area of the display; and
use, at the presentation device, the first and second timestamps to synchronize a visual presentation of the ancillary data in a second portion of the display area of the display with a depiction of the action in the visual presentation of the video recording according to the timestamps.

13. The apparatus of claim 12, the logic to:
visually present an advertisement in response to an indication of a pause in play of the game event in the ancillary data; and
use a third timestamp associated with the indication of the pause to synchronize the visual presentation of the advertisement with a visible indication of the pause in the video recording.

14. The apparatus of claim 13, the logic to time the visual presentation of the advertisement to occur within a period of time determined from a difference in times indicated between the third timestamp and a fourth timestamp associated with an indication of a resumption of play of the game event in the ancillary data.

15. The apparatus of claim 13, the logic to visually present the advertisement in the first portion.

16. The apparatus of claim 12, the second portion of the display area does not overlap the first portion.

17. The apparatus of claim 12, the game event comprising one of a sporting event, a television game show, a board game, and a card game.

18. The apparatus of claim 12, the ancillary data comprising a scoreboard data, and the action comprising one of a change in official timekeeping of the game event and a change in score.

19. The apparatus of claim 12, the ancillary data comprising a statistics data of a play of the game event.

20. At least one non-transitory machine-readable storage medium of a synchronized presentation system comprising instructions that when executed by a computing device, cause the computing device to:
receive a program data comprising a video recording of a game event;
receive an indication of a current time from a time server;
synchronize a clock to the current time;
receive a scoreboard data comprising an indication of an action related to play of the game event, a first timestamp indicating a first time indicated by the clock associated with a start of the video recording, and a second timestamp indicating a second time indicated by the clock associated with the action relative to the first timestamp;
visually present, at a presentation device, the video recording in a first portion of a display area of a display of the computing device; and
use, at the presentation device, the first and second timestamps to synchronize a visual presentation of the scoreboard data in a second portion of the display area of the display with a depiction of the action in the visual presentation of the video recording according to the timestamps.

21. The at least one non-transitory machine-readable storage medium of claim 20, the computing device caused to:
visually present an advertisement in response to an indication of a pause in play of the game event in the ancillary data; and
use a third timestamp associated with the indication of the pause to synchronize the visual presentation of the advertisement with a visible indication of the pause in the video recording.

22. The at least one non-transitory machine-readable storage medium of claim 21, the computing device caused to time the visual presentation of the advertisement to occur within a period of time determined from a difference in times indicated between the third timestamp and a fourth timestamp associated with an indication of a resumption of play of the game event in the ancillary data.

23. The at least one non-transitory machine-readable storage medium of claim 21, the computing device caused to visually present the advertisement in the first portion.

24. The at least one non-transitory machine-readable storage medium of claim 20, the game event comprising one of a sporting event, a television game show, a board game, and a card game.

* * * * *